US009518174B2

(12) United States Patent
Ascione et al.

(10) Patent No.: US 9,518,174 B2
(45) Date of Patent: Dec. 13, 2016

(54) TREAD COMPOUND PRODUCTION METHOD

(71) Applicant: BRIDGESTONE CORPORATION, Tokyo (JP)

(72) Inventors: Riccardo Ascione, Rome (IT); Davide Privitera, Anzio (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/439,172

(22) PCT Filed: Oct. 29, 2013

(86) PCT No.: PCT/IB2013/059760
§ 371 (c)(1),
(2) Date: Apr. 28, 2015

(87) PCT Pub. No.: WO2014/068486
PCT Pub. Date: May 8, 2014

(65) Prior Publication Data
US 2015/0284549 A1    Oct. 8, 2015

(30) Foreign Application Priority Data

Oct. 29, 2012   (IT) .............. TO2012A0954

(51) Int. Cl.
| C08L 9/00 | (2006.01) |
| C08K 5/08 | (2006.01) |
| C08K 5/44 | (2006.01) |
| C08K 5/548 | (2006.01) |
| C08L 9/06 | (2006.01) |
| C08K 5/098 | (2006.01) |
| B60C 1/00 | (2006.01) |
| C08K 5/00 | (2006.01) |

(52) U.S. Cl.
CPC ............. *C08L 9/06* (2013.01); *B60C 1/0016* (2013.04); *C08K 5/098* (2013.01); *C08K 5/44* (2013.01); *C08K 5/548* (2013.01); *C08K 5/0025* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 2008/0194748 A1* | 8/2008 | Futamura | C08K 5/548 524/394 |
| 2010/0317782 A1* | 12/2010 | Hattori | B60C 1/0016 524/300 |
| 2011/0136961 A1* | 6/2011 | Hattori | B60C 1/0016 524/493 |
| 2011/0136962 A1* | 6/2011 | Hattori | B60C 1/0016 524/493 |
| 2015/0284549 A1* | 10/2015 | Ascione | C08L 9/06 523/156 |

FOREIGN PATENT DOCUMENTS

| IT | WO 2008071208 A1 * | 6/2008 | .......... B60C 1/0016 |
| WO | 2008/071208 A1 | 6/2008 | |

OTHER PUBLICATIONS

Database WPI Week 201075, Thomson Scientific, London, GB; AN 2010-N74353, XP002723009, Nov. 4, 2010.
Oliver Klockmann et al., "Processing of New Rubber Silane VP SI 363 Application of the new rubber silane VP Si 363 (ITEC 2006; 29B)", The International Tire Exhibition & Conference, Akron, OH, Sep. 16-18, 2006, XP055112724.
Rainer Friehmelt et al., "Moderne Fullstoffsysteme— Materialkonzepte fur Leichtlaufreifen Innovative Filler Systems— Material Concepts for Tires with Reduced Rolling Resistance", Symposium Synthesekautschuk 2011, Jun. 16, 2011, XP055112971.
International Search Report of PCT/IB2013/059760 dated Apr. 24, 2014 [PCT/ISA/210].

* cited by examiner

*Primary Examiner* — Peter A Salamon
(74) *Attorney, Agent, or Firm* — Sughrue Mion, PLLC

(57) ABSTRACT

A rubber compound production method including a first mixing step wherein at least one cross-linkable unsaturated-chain polymer base, silica, and a silane bonding agent in the alkoxymercaptoalkyl-silane class are mixed together; and a following mixing step wherein a curing system having at least sulphur and accelerants is added and mixed to the compound being produced. 0.2 to 5 phr of an accelerant, and 0.5 to 6 phr of a zinc salt of a fatty acid with a carbon atom number of C8 to C24 are added at the first mixing step. The accelerant is from the group of benzothiazyl-cyclohexyl-sulphenamide (CBS), benzothiazole disulphide (MBTS), N-tert-butyl-2-benzothiazylsulphenamide (TBBS), 2-mercaptobenzothiazole (MBT), zinc salts of 2-mercaptobenzothiazole (ZMBT), benzothiazyl-2-dicyclohexyl-sulphenamide (DCBS), diphenylguanidine (DPG), triphenylguanidine (TPG), diorthotolyl guanidine (DOTG), o-tolylbiguanidine (OTBG), ethylene thiourea (ETU) and their mixtures.

9 Claims, No Drawings

TREAD COMPOUND PRODUCTION METHOD

CROSS REFERENCE TO RELATED APPLICATIONS

This application is a National Stage of International Application No. PCT/IB2013/059760, filed Oct. 29, 2013, claiming priority based on Italian Patent Application No. TO2012A000954, filed Oct. 29, 2012, the contents of all of which are incorporated herein by reference in their entirety.

TECHNICAL FIELD

The present invention relates to a method of producing a tread compound.

BACKGROUND ART

As is known, tyre research is partly focused on achieving treads with improved performance in terms of rolling and wear resistance.

For this purpose, silica has long been used as a reinforcing filler in tread compounds, as a substitute for carbon black, because of the advantages it affords in terms of rolling resistance and wet road-holding performance.

Silica is used in conjunction with silane bonding agents, which, bonding with silanol groups, prevent the formation of hydrogen bonds between silica particles and, at the same time, bond the silica chemically to the polymer base.

Trialkoxymercaptoalkyl-silanes are a particularly interesting class of silane bonding agents because of the advantages they afford in reducing both rolling resistance and the emission of volatile substances.

The compound which has proved most effective is:

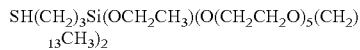

This class of silane bonding agents, however, has been found to pose problems in terms of processing. More specifically, the presence in a rubber compound of a trialkoxymercaptoalkyl-silane compound may increase the viscosity of the rubber compound, with obvious effects on its ability to be processed.

To solve the processing problems involved, plasticizing oils are normally added to the rubber compound, but, alongside a reduction in viscosity, also impair the rubber compound in terms of wear resistance. The common practice is to reduce the effect on wear resistance by increasing interaction between the silica, silane bonding agent and polymer at the curing stage, but this has the effect of reducing scorch time.

A need is therefore felt for a method designed to solve the processing problems posed by using trialkoxymercaptoalkyl-silanes, but without incurring other drawbacks in terms of wear resistance or reducing scorch time.

DISCLOSURE OF INVENTION

According to the present invention, there is provided a rubber compound production method comprising a first mixing step wherein at least one cross-linkable unsaturated-chain polymer base, silica, and a silane bonding agent in the alkoxymercaptoalkyl-silane class are mixed together; and a following mixing step wherein a curing system comprising at least sulphur and accelerants is added and mixed to the compound being produced; said method being characterized in that 0.2 to 5 phr of an accelerant, and 0.5 to 6 phr of a zinc salt of a fatty acid with a carbon atom number of C8 to C24 are added at said first mixing step; said accelerant being comprised in the group consisting of benzothiazyl-cyclohexyl-sulphenamide (CBS), benzothiazole disulphide (MBTS), N-tert-butyl-2-benzothiazylsulphenamide (TBBS), 2-mercaptobenzothiazole (MBT), zinc salts of 2-mercaptobenzothiazole (ZMBT), benzothiazyl-2-dicyclohexyl-sulphenamide (DCBS), diphenylguanidine (DPG), triphenylguanidine (TPG), diorthotolyl guanidine (DOTG), o-tolylbiguanidine (OTBG), ethylene thiourea (ETU) and their mixtures.

Preferably, the fatty acid of said zinc salt has a carbon atom number of C14 to C18.

Preferably, 4 to 18 phr of the silane bonding agent in the trialkoxymercaptoalkyl-silane class is used.

Preferably, said silane bonding agent in the trialkoxymercaptoalkyl-silane class is of the general formula (I)

$$R^1R^2{}_2Si\text{---}R^3\text{---}SH \tag{I}$$

where:

$R^1$ is a linear, cyclic, or branched alkoxyl group with 1 to 8 carbon atoms; $R^2$ is a linear, cyclic, or branched alkoxyl group with 1 to 8 carbon atoms or ---O---(Y---O)m4-X (Y is a linear, cyclic or branched saturated or unsaturated divalent hydrocarbon group with 1 to 20 carbon atoms; X is a linear, cyclic or branched alkyl group with 1 to 9 carbon atoms; and m4 is a number from 1 to 40); and $R^3$ is a linear, cyclic or branched saturated or unsaturated alkylene group with 1 to 12 carbon atoms.

Preferably, said silane bonding agent in the trialkoxymercaptoalkyl-silane class is a trialkoxymercaptopropyl-silane.

Preferably, the trialkoxymercaptopropyl-silane has the formula (II)

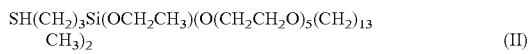

According to the present invention, there is also provided a tread compound made using the method defined above.

According to the present invention, there is also provided a tread made from the above compound.

According to the present invention, there is also provided a tyre comprising the above tread.

The following are examples for a clearer understanding of the present invention.

EXAMPLES

Four compounds according to the present invention (Compounds A-D) and four control compounds (Compounds E-H) were produced. More specifically, control Compound E is a standard tread compound of acknowledged satisfactory characteristics; control Compounds F-H are compounds in which the ingredients characterizing the method according to the present invention are used separately.

Each compound was then tested for wet road-holding performance, rolling resistance, wear resistance, viscosity, and scorch time.

The compounds described in the examples were produced using the method described below.

Preparation of the Compounds (1st Mixing Step)

A 230-270-liter tangential-rotor mixer was loaded, prior to commencing mixing, with the cross-linkable polymer base, silica, silane bonding agent, oil, and, if any, the zinc salt and the accelerant, to a 66-72% fill factor.

The mixer was operated at a speed of 40-60 rpm, and the resulting compound unloaded on reaching a temperature of 140-160° C.

(Final Mixing Step)

The curing system was added to the compound from the preceding step to a 63-67% fill factor.

The mixer was operated at a speed of 20-40 rpm, and the resulting compound unloaded on reaching a temperature of 100-110° C.

Table I shows the compositions in phr of the four compounds according to the present invention.

TABLE I

|  | A | B | C | D |
|---|---|---|---|---|
| First mixing step | | | | |
| BR | 15.00 | 15.00 | 15.00 | 15.00 |
| S-SBR | 50.00 | 50.00 | 50.00 | 50.00 |
| E-SBR | 35.00 | 35.00 | 35.00 | 35.00 |
| SILICA | 61.00 | 61.00 | 61.00 | 61.00 |
| MBTS | 3.00 | 0.00 | 1.00 | 4.00 |
| TBBS | 0.00 | 3.00 | 0.00 | 0.00 |
| Zn salts | 2.00 | 2.00 | 1.00 | 4.00 |
| SI363 | 8.20 | 8.20 | 4.20 | 12.20 |
| OIL | 2.00 | 2.00 | 2.00 | 2.00 |
| Final mixing step | | | | |
| MBTS | 1.00 | 1.00 | 1.00 | 1.00 |
| Sulphur | 1.95 | 1.95 | 1.95 | 1.95 |
| DPG | 1.00 | 1.00 | 1.00 | 1.00 |
| ZnO | 1.70 | 1.70 | 1.70 | 1.70 |
| TBBS | 1.30 | 1.30 | 1.30 | 1.30 |
| Stearic acid | 1.00 | 1.00 | 1.00 | 1.00 |

Table II shows the compositions in phr of the four control compounds.

TABLE II

|  | E | F | G | H |
|---|---|---|---|---|
| First mixing step | | | | |
| BR | 15.00 | 15.00 | 15.00 | 15.00 |
| S-SBR | 50.00 | 50.00 | 50.00 | 50.00 |
| E-SBR | 35.00 | 35.00 | 35.00 | 35.00 |
| SILICA | 61.00 | 61.00 | 61.00 | 61.00 |
| MBTS | 0.00 | 0.00 | 0.00 | 3.00 |
| Zn salts | 0.00 | 0.00 | 2.00 | 0.00 |
| SI75 | 8.20 | 0.00 | 0.00 | 0.00 |
| SI363 | 0.00 | 8.20 | 8.20 | 8.20 |
| OIL | 2.00 | 2.00 | 2.00 | 2.00 |
| Final mixing step | | | | |
| MBTS | 1.00 | 1.00 | 4.00 | 1.00 |
| Sulphur | 1.95 | 1.95 | 1.95 | 1.95 |
| DPG | 1.00 | 1.00 | 1.00 | 1.00 |
| ZnO | 1.70 | 1.70 | 1.70 | 1.70 |
| TBBS | 1.30 | 1.30 | 1.30 | 1.30 |
| Stearic acid | 1.00 | 1.00 | 1.00 | 1.00 |

In Tables I and II:

S-SBR and E-SBR have a mean molecular weight of $800\text{-}1500\times10^3$ and $500\text{-}900\times10^3$ respectively. More specifically, S-SBR has a 10-45% styrene content, a 20-70% vinyl content, and a 0-30% oil content; while E-SBR has a 20-45% styrene content, and a 0-30% oil content.

The silica used is marketed by EVONIK under the trade name VN3, and has a surface area of 170 $m^2/g$.

SI363 is the trade name of a silane bonding agent in the trialkoxymercaptoalkyl-silane class and of formula SH $(CH_2)_3Si\ (OCH_2CH_3)\ (O(CH_2CH_2O)_5\ (CH_2)_{12}CH_3)_2$ MBTS, TBBS and DPG stand for benzothiazole disulphide, N-tert-butyl-2-benzothiazylsulphenamide and diphenylguanidine respectively.

The zinc salts used in the examples are composed of a mixture of salts derived from fatty acids with a carbon atom number of C14 to C18.

SI75 is the trade name of a silane bonding agent of formula $(CH_3CH_2O)_3Si\ (CH_2)_3Sn(CH_2)_3Si\ (OCH_2CH_3)_3$ where $1<n<4$ As stated, compounds A-H were tested for wet road-holding performance, rolling resistance, wear resistance, viscosity, and scorch time.

More specifically, TanD values at different temperatures, to measure wet road-holding performance and rolling resistance, were measured as per ASTM Standard D5992. Abrasion resistance was measured as per DIN Standard 53 516. Viscosity and scorch time (Mooney Scorch at 130° C.) were measured as per ASTM Standard D1646.

Table III shows the above test results relative to compounds A-D according to the invention. The values in Table III are indexed to the values of control compound E in Table IV.

TABLE III

|  | A | B | C | D |
|---|---|---|---|---|
| Wet road-holding | 100 | 100 | 100 | 100 |
| Rolling resistance | 112 | 112 | 106 | 118 |
| Abrasion resistance | 130 | 125 | 115 | 150 |
| Viscosity | 80 | 85 | 95 | 70 |
| Scorch Time | 100 | 100 | 125 | 100 |

Table IV shows the above test results relative to control compounds E-H and also indexed to the values of compound E.

TABLE IV

|  | E | F | G | H |
|---|---|---|---|---|
| Wet road-holding | 100 | 100 | 100 | 100 |
| Rolling resistance | 100 | 110 | 112 | 112 |
| Abrasion resistance | 100 | 100 | 100 | 130 |
| Viscosity | 100 | 130 | 100 | 100 |
| Scorch Time | 100 | 100 | 80 | 80 |

As shown clearly from a comparison of Tables III and IV, the method according to the invention produces compounds having the advantages derived from use of trialkoxymercaptoalkyl-silanes (rolling resistance), but with none of the drawbacks in terms of processing, wear resistance or reduction in scorch time.

More specifically, the compound G and H results in Table IV show how using the accelerant in combination with the zinc salts, but at different mixing steps, and using the accelerant on its own, are not enough to achieve the required scorch time results. This confirms the synergic effect of using the zinc salts and the accelerant simultaneously at the first mixing step. Furthermore, the compounds produced using the method according to the present invention have a much lower viscosity than the control compounds, with obvious advantages in terms of processing.

The invention claimed is:

1. A rubber compound production method comprising a first mixing step wherein at least one cross-linkable unsaturated-chain polymer base, an accelerant, silica, and a silane bonding agent in the alkoxymercaptoalkyl-silane class are mixed together; and a following mixing step wherein a curing system comprising at least sulphur and accelerants is added and mixed to the compound being produced; and wherein, in said first mixing step, 0.2 to 5 phr of said accelerant in said first mixing step, and 0.5 to 6 phr of a zinc salt of a fatty acid with a carbon atom number of C8 to C24 are added; said accelerant being from the group consisting of benzothiazyl-cyclohexyl-sulphenamide (CBS), benzothiazole disulphide (MBTS), N-tert-butyl-2- benzothiazylsulphenamide (TBBS), 2- mercaptobenzothiazole (MBT), zinc salts of 2-mercaptobenzothiazole (ZMBT), benzothiazyl-2-dicyclohexyl-sulphenamide (DCBS), diphenylguanidine (DPG), triphenylguanidine (TPG), diorthotolyl guanidine (DOTG), o-tolylbiguanidine (OTBG), ethylene thiourea (ETU) and their mixtures.

2. A rubber compound production method as claimed in claim 1, characterized in that the fatty acid of said zinc salt has a carbon atom number of C14 to C18.

3. A rubber compound production method as claimed in claim 1, characterized in that 4 to 18 phr of the silane bonding agent in the trialkoxymercaptoalkyl-silane class is used.

4. A rubber compound production method as claimed in claim 1, characterized in that said silane bonding agent in the trialkoxymercaptoalkyl-silane class is of the general formula (I)

$$R^1R^2{}_2Si\text{—}R^3\text{—}SH \qquad (I)$$

where:
$R^1$ is a linear, cyclic, or branched alkoxyl group with 1 to 8 carbon atoms; $R^2$ is a linear, cyclic, or branched alkoxyl group with 1 to 8 carbon atoms or —O—(Y—O)m4-X (Y is a linear, cyclic or branched saturated or unsaturated divalent hydrocarbon group with 1 to 20 carbon atoms; X is a linear, cyclic or branched alkyl group with 1 to 9 carbon atoms; and m4 is a number from 1 to 40); and $R^3$ is a linear, cyclic or branched saturated or unsaturated alkylene group with 1 to 12 carbon atoms.

5. A rubber compound production method as claimed in claim 4, characterized in that said silane bonding agent in the trialkoxymercaptoalkyl-silane class is a trialkoxymercaptopropyl-silane.

6. A rubber compound production method as claimed in claim 5, characterized in that the trialkoxymercaptopropyl-silane has the formula (II)

$$SH(CH_2)_3Si(OCH_2CH_3)(O(CH_2CH_2O)_5(CH_2)_{13}CH_3)_2 \qquad (II).$$

7. A tread compound made using a method as claimed in claim 1.

8. A tread made from a compound as claimed in claim 7.

9. A tire comprising a tread as claimed in claim 8.

* * * * *